United States Patent [19]

Perego

[11] 4,049,292
[45] Sept. 20, 1977

[54] BABY CARRIAGE FOLDABLE IN WIDTH AND SHORTENABLE IN HEIGHT SO AS TO BE EASILY CARRIED ON A PERSON'S ARM LIKE AN UMBRELLA

[75] Inventor: Giuseppe Perego, Arcore (Milan), Italy

[73] Assignee: Perego-Pines S.p.A., Italy

[21] Appl. No.: 647,876

[22] Filed: Jan. 9, 1976

[30] Foreign Application Priority Data

July 25, 1975 Italy .................................. 25753/75

[51] Int. Cl.² ............................................. B62B 7/08
[52] U.S. Cl. .................................... 280/642; 280/42; 280/650
[58] Field of Search ............... 280/641, 642, 644, 647, 280/650, 42; 296/1 B, 28 B

[56] References Cited

U.S. PATENT DOCUMENTS

| 2,616,718 | 11/1952 | Heideman | 280/650 |
| 2,847,058 | 8/1958 | Lee | 280/42 X |
| 3,936,069 | 2/1976 | Giordani | 280/644 |

Primary Examiner—Joseph F. Peters, Jr.
Assistant Examiner—Michael J. Forman
Attorney, Agent, or Firm—McGlew and Tuttle

[57] ABSTRACT

The carriage has a pair of elongated handles each having an upper sleeve slidable therealong and each having a respective elongated front leg of the carriage secured to the associated sleeve. A pair of elongated rear legs have their upper ends pivotally connected to respective front legs intermediate the ends of the latter, and each leg has a support wheel rotatably mounted on its lower end. A respective lower sleeve is slidable along the lower portion of each front leg. An X-frame, formed by a pair of elongated arms pivotally connected intermediate their ends, interconnects the upper and lower sleeves, each arm having its upper end pivotally connected to the upper sleeve slidable on one handle and its lower end pivotally connected to the lower sleeve slidable on the front leg connected to the upper sleeve slidable on the other handle. Tie rods are connected at one end to each upper sleeve and are connected at their opposite ends to an operating knob. By upward or downward movement of the operating knob, the X-frame can be contracted or expanded to selectively collapse or erect the carriage or push-chair. A foldable seat back has wings connected to the respective tie-rods and also to the front legs, and a foldable seat is connected at its opposite sides to U-frames, each having one leg pivotally connected to a respective lower sleeve and another leg connected to the associated handle.

7 Claims, 5 Drawing Figures

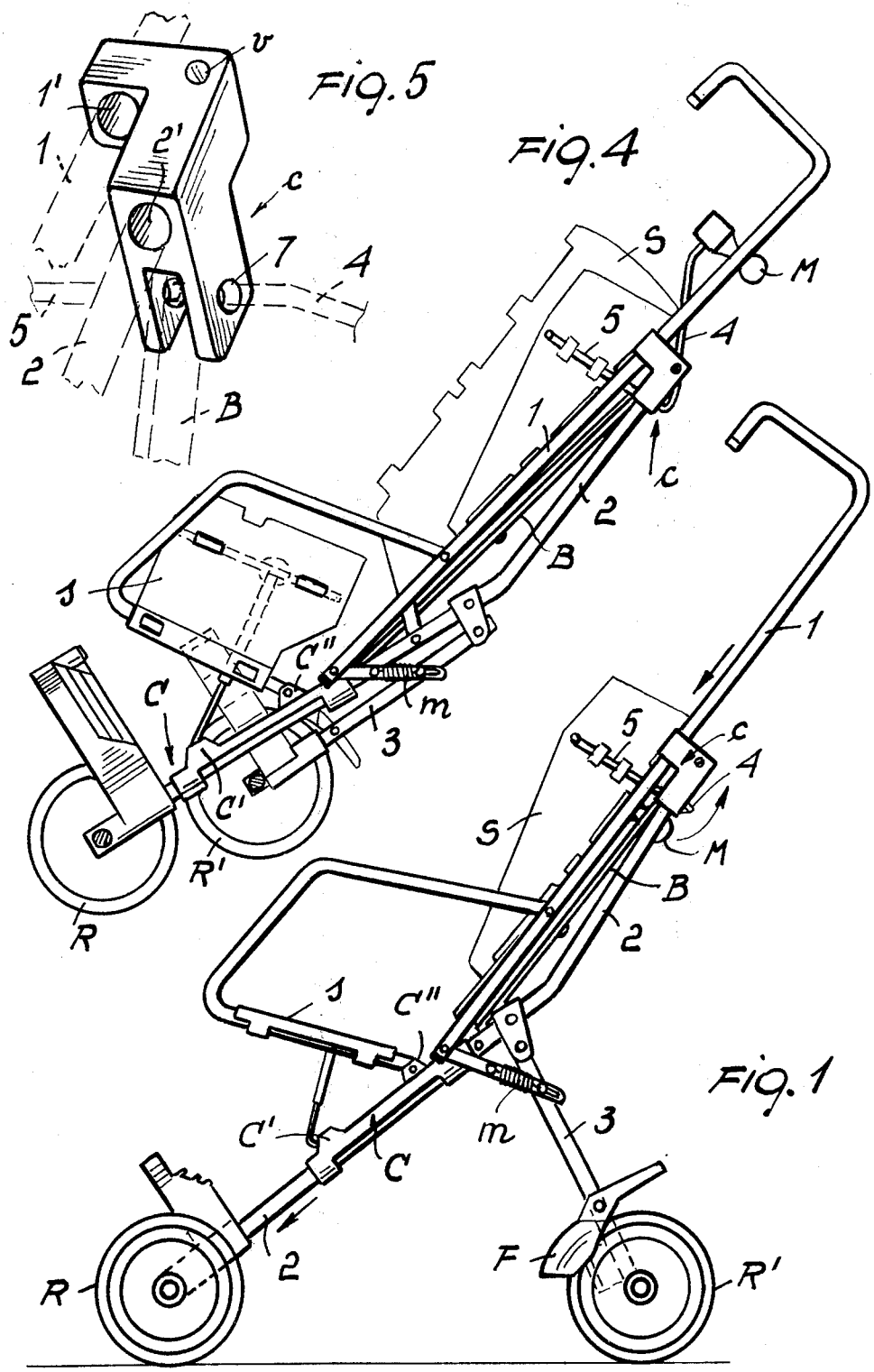

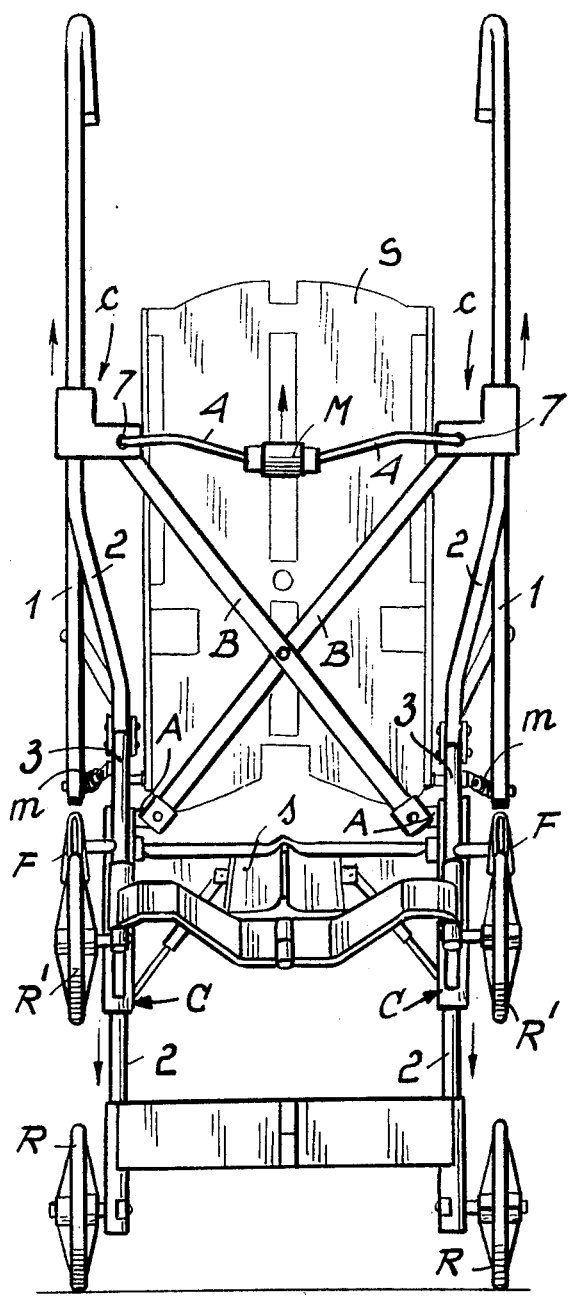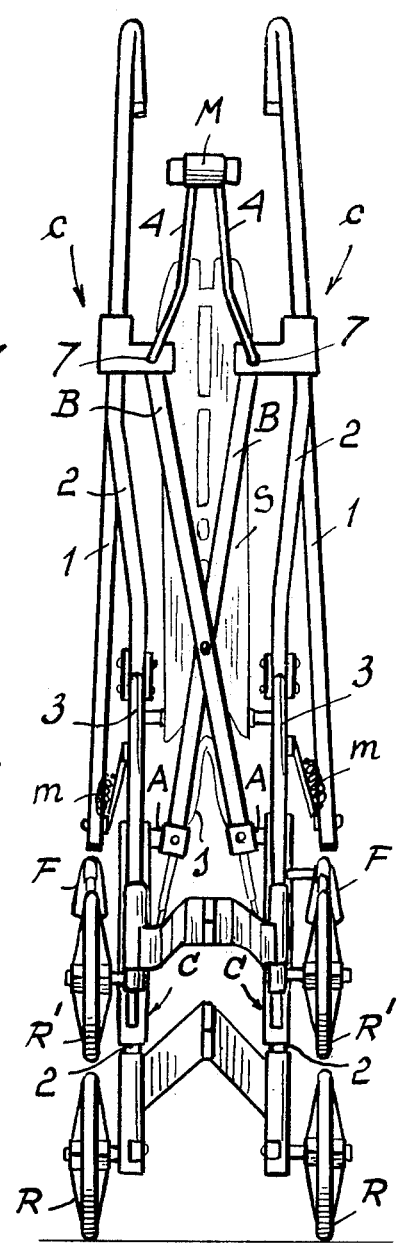

BABY CARRIAGE FOLDABLE IN WIDTH AND SHORTENABLE IN HEIGHT SO AS TO BE EASILY CARRIED ON A PERSON'S ARM LIKE AN UMBRELLA

FIELD AND BACKGROUND OF THE INVENTION

Baby carriages or push-chairs have considerably improved in recent years from the point of view of comfort and rationality.

The main concern has been for the child, trying to ensure a comfortable position when the child is sitting down, by means of a suitable seat and seat-back, to enable the child to lean with its back against it in an appropriate way from the medical and hygienic point of view, and smooth transport by providing the carriage legs with suitable springing means.

It has also been desired to reduce to a minimum the bulk of the carriage and to make it capable of being easily carried by the mother or whoever takes her place.

The various foldable baby carriages or push-chairs hitherto manufactured have not met the foregoing requirements, with resultant disadvantages to the child or the mother.

There are on the market baby carriages foldable in width, but they are bulky due to their excessive length, and there are others which may be carried like umbrellas but have a seat and seat-back which are not correct from the anatomic point of view and either lack, or have insufficient, springing properties.

SUMMARY OF THE INVENTION

The baby carriage which is the object of the present invention eliminates such drawbacks due to the application thereto of certain constructional features completely new in this field. The first feature consists in providing a spider or crosspiece, the ends of which are integral with respective sliding pieces or sleeves, the upper ones on the handles of the carriage and the lower ones on the front legs thereof; the arms of the crosspiece are capable of moving closer to each other or farther from one another like an X, by pushing downwardly or upwardly a knob which is centrally located with respect to the upper sleeves and connected thereto by means of two tie rods.

Such a constructional feature enables reduction of the carriage height when it is folded in the direction of its width. A second feature is the shape of each tie rod connecting the knob to an upper sleeve, since the tie rod is L shaped with a horizontal arm of the L, bent at 90° ending in the knob, and the other arm, which is perpendicular to the first one, extending beyond the sleeve and being integral, at one side, with the seat-back. Thereby when the knob is pushed upwardly, the sleeves come closer to each other and, the crosspiece closes and at the same time, the tie rods come closer to each other and the seat-back folds down. This is assisted by the particular lightened or weakened structure along the center axis provided therefor.

A third feature is the rigid structure, preferably made of plastic material, of the seat-back as well as the seat of the carriage and very suited to the good health of the child. This structure is secured at the sides of the seat with a metal portion having the shape of a U lying on one side, one end of which is fixed to the lower portion of one of the handles and the other to the respective lower sleeve (sliding on one front leg of the carriage) and is further provided underneath the seat, equally spaced from the sides thereof and from the center portion (purposely lightened to make it foldable), with two other metal pieces welded at the center of the cylindrical portion of an equal number of small telescoping tubes, the inner sliding portion of which terminates at the end of one of the lower sleeves, whereby when the latter are urged to slide downwardly along the front legs by bending the crosspiece, also the sides of the seat will be pushed downwardly and the center portion will be folded upwardly in "book" fashion.

A fourth feature is that each rear leg not only is connected by means of a band to a respective front leg but is also connected by means of a metal strap to the lower end of one of the handles as well as to the upper end of a sleeve sliding on the front leg, whereby the legs may be moved closer to each other when the sleeve descends.

A fifth feature consists in providing, between the front wheels as well as between the rear wheels, a plastic band consisting of two rigid portions hinged at the one end with one of the legs and at the other end with a center pin, and which therefore are able to keep the respective legs far from one another or close to each other depending on whether they assume an extended or a folded position.

The above mentioned constructional features serve the sole purpose to allow the carriage to be folded, as mentioned, in the direction of its width and to be simultaneously shortened in height without it being hindered by the seat-back or the seat.

The metal strap laterally connecting two legs is further provided, as in another baby carriage previously patented by the Applicant, with a slot within which slides a pin fixed to the rear leg, a spring being fixed at one end to this pin and at the other to another similar pin fixed to the metal strap, so that the pace of the carriage is suitably smoothed.

These and other minor features will appear from the following description of the carriage, with reference to the accompanying drawings illustrating a preferred embodiment given by way of example only and without limitation.

BRIEF DESCRIPTION OF THE DRAWINGS

In the drawings:

FIG. 1 is a side view and FIG. 2 a rear view of the baby carriage according to the invention in an open position ready for use;

FIG. 3 is a rear view of the same;

FIG. 4 is a side view of the carriage in a folded position; and

FIG. 5 is a perspective view one of the upper sliding sleeve.

DESCRIPTION OF THE PREFERRED EMBODIMENT

As may be seen from the drawing, the baby carriage is provided with two handles 1 terminating in hook-shaped handgrips, two front legs 2 and two rear legs 3, the legs terminating in respective wheels R and R', with the latter being provided with a "spoon" shaped brake which may be depressed, as well as being provided with a seat $s$ and a seat-back S, only the plastic structure of which in shown, for the sake of clarity.

The main feature is provided (see FIGS. 2 and 3) by the spider or crosspiece having arms B intersecting and pivotally connected to each other, and connected at their lower ends to connectors A integral with the lower sleeves C sliding on the front legs 2, the arms B being connected at their upper ends directly to the upper sleeves c sliding on handles 1.

Each of the upper sleeves c (see FIG. 5) is L shaped as seen from the side and the rear, with a handle 1 slipped therethrough sliding in a suitable hole 1', and a front leg 2 engaged in a suitable hole 2', is fixed by means of a setscrew v. A tie rod 4, 5 extends through sleeve c in another hole 7 and also extends through one end of a crosspiece B.

As may be seen from FIGS. 2 and 4, arm 5 of each tie rod is substantially perpendicular to arm 4, and the latter terminates, with an end bent at substantially 90°, in knob M where the bent end turns in a suitable slot or bore arm 5. Each is integral with a respective limb or wing of the seat-back S.

The structure of seat s is hinged at each side on the lower leg of a U (lying on one leg), the ends of which are connected to a respective handle 1 and a respective lower sleeve C, by pivotal connection to a bracket C". Seat s is provided (see FIG. 4) with two further longitudinal metal rods welded at the center to the tubular portions of respective small telescoping tubes, the sliding inner portion of which is connected to the respective sleeve, C at bracket C'.

Each sleeve C is also connected, in addition, to the lower end of a respective handle 1, to which is connected the end of a metal strap connected to the leg 3, and which, as shown, is provided with a spring m.

In the drawing are also shown, without being numbered, the respective strips interconnecting the front wheels R and the rear wheels R'. The way in which the baby carriage may be folded and expanded in position ready for use, should be obvious from the foregoing description and may easily be deduced by comparing FIGS. 2 and 3 and 1 or 4 respectively.

The upper sleeves c slide upwardly on handles 1 when knob M is raised, crosspiece B closes and the lower sleeves C slide downwardly on legs 2 whereby the carriage is shortened. Simultaneously, by means of tie rods 4, 5 connected to upper sleeves c, the seat-back S folds about its weakened center and by means of the telescoping small tubes connected to the lower sleeves C, also the seat s folds about its weakened center.

The rear legs 3 finally come closer to the front legs 2 by means of the metal straps which connect them to the lower sleeves C and to handles 1.

While a specific embodiment of the invention has been shown and described in detail to illustrate the application of the principles of the invention, it will be understood that the invention may be embodied otherwise without departing from such principles.

What I claim is:

1. A foldable baby carriage comprising, in combination, a pair of laterally spaced elongated handles; respective upper sleeves slidable on said handles; a pair of elongated front legs having their upper ends secured to said respective upper sleeves; a pair of elongated rear legs each pivotally connected to an intermediate portion of a respective front leg; respective wheels on the lower ends of said front and rear legs; respective means interconnecting each rear leg to the lower end of the adjacent handle to move the rear legs toward the front legs when the carriage is folded and to maintain the rear legs extended when the carriage is erected; respective lower sleeves slidable on the lower portions of said front legs; an X-frame, formed by a pair of elongated arms pivotally interconnected intermediate their ends, each arm having its upper end pivotally connected to the upper sleeve slidable on one handle and its lower end pivotally connected to the lower sleeve slidable on that front leg connected to the upper sleeve slidable on the other handle; operating means interconnecting said upper sleeves for conjoint displacement along the respective handles to contract and expand said X-frame, with said lower sleeves being displaced along the respective front legs, to selectively erect or collapse said foldable baby carriage; a foldable seat; and means connecting opposite sides of said foldable seat to elements of said foldable baby carriage for folding and unfolding therewith.

2. A foldable baby carriage, as claimed in claim 1, in which said operating means comprises two tie rods having their outer ends connected to respective upper sleeves; and an operating knob interconnecting the inner ends of said tie rods.

3. A foldable baby carriage, as claimed in claim 2, including a chair having a back and said seat, said back and said seat comprising covered ridge structures foldable along weakened longitudinal center lines; and means connecting opposite sides of said back and said seat to elements of the foldable baby carriage for folding about their respective weakened longitudinal center lines during collapsing of the foldable carriage and unfolding during erection of the foldable carriage.

4. A foldable baby carriage, as claimed in claim 3, in which said back and seat are molded of plastic composition material.

5. A foldable baby carriage, as claimed in claim 2, in which each tie rod is substantially L-shaped with first and second arms extending substantially perpendicular to each other; the first arm of each tie rod having an end bent perpendicular thereto and engaged in said knob; the second arm of each tie rod extending through a bore in the associated sleeve; and a seat back having wings at each side secured to the projecting portions of respective tie rods; said seat back being weakened along its longitudinal center line whereby, when said knob is raised, said seat back will bend in the direction of its width.

6. A foldable baby carriage, as claimed in claim 1, including respective bands interconnecting said front legs to each other and said rear legs to each other; respective side straps connecting each rear leg to the lower end of the associated handle; whereby the front and rear legs are swung toward each other as said lower sleeves move downwardly during folding of the foldable baby carriage, and are moved apart during erection of the foldable baby carriage.

7. A foldable baby carriage, as claimed in claim 1, in which said seat has arms formed by a U-shaped tubular structure with horizontally extending upper and lower legs; the upper leg of each U-shaped structure being secured to the lower portion of a respective handle, and the lower leg of each U-shaped structure being secured to the lower sleeve on the associated front legs; said foldable seat including a foldable seat portion formed of plastic composition material and hingedly connected at its opposite sides to the lower legs of respective U-shaped structures; the seat portion being weakened along its longitudinal center line; a pair of elongated metal rods integral with the lower surface of said seat portion and extending in spaced parallel relation on opposite sides of the weakened center line portion thereof; a pair of telescoping elements, each including a tubular portion and a rod portion slidable in the tubular portion; the tubular portion of each telescoping element being secured to the center portion of a respective one of said metal rods, and each rod portion having its outer end secured to a respective lower sleeve; whereby, when said lower sleeves slide downwardly on said front legs, responsive to collapsing of the foldable baby carriage, the side edges of said seat portion will be moved downwardly and the center portion thereof will fold upwardly in "book" fashion.

* * * * *